W. H. OGDEN.
TOY.
APPLICATION FILED MAR. 26, 1919.
1,364,512.
Patented Jan. 4, 1921.
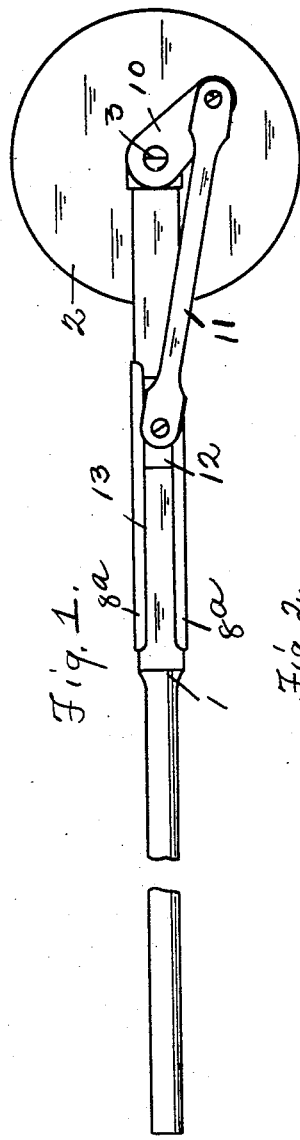
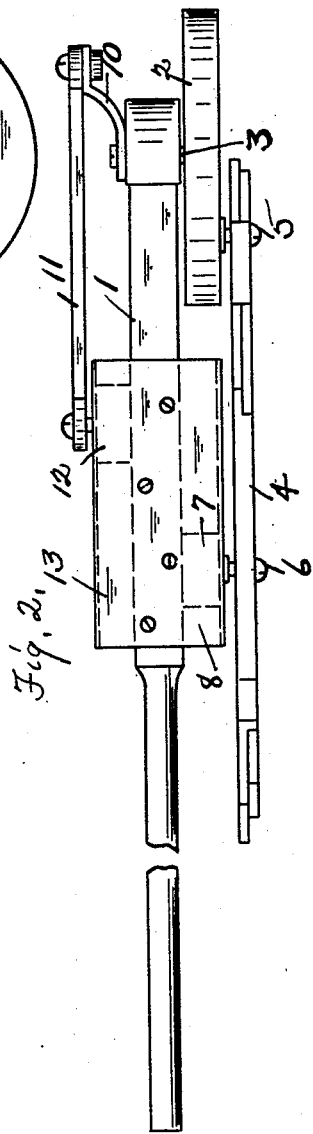
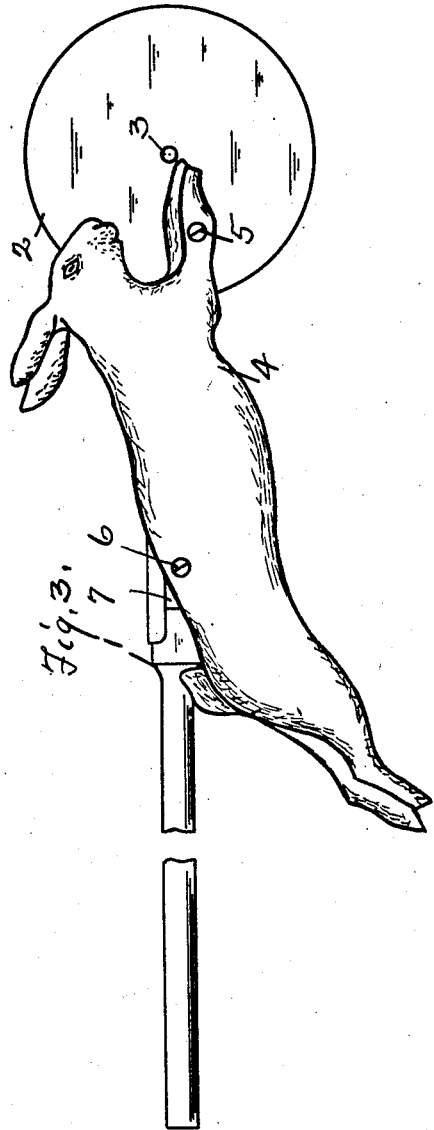
Inventor
Ward H. Ogden
By
Attorney

UNITED STATES PATENT OFFICE.

WARD H. OGDEN, OF EAST MILLCREEK, PENNSYLVANIA.

TOY.

1,364,512.          Specification of Letters Patent.      Patented Jan. 4, 1921.

Application filed March 26, 1919. Serial No. 285,321.

*To all whom it may concern:*

Be it known that I, WARD H. OGDEN, a citizen of the United States, residing in East Millcreek, in the county of Erie and State of Pennsylvania, have invented new and useful Improvements in Toys, of which the following is a specification.

The toy is designed to give a reciprocating and orbital movement to a device through the traction of a driving wheel and in its preferred form this reciprocating movement is given to an animal, the movement simulating the running motion of an animal.

The invention is illustrated in the accompanying drawings as follows:—

Figure 1 shows a side elevation of the device.

Fig. 2 a plan view of the device.

Fig. 3 a side elevation of the device, the view of Fig. 3 being from the opposite side from that of Fig. 1.

1 marks the push rod which is grasped by the operator and 2 a traction wheel which is mounted on a shaft 3 journaled in the push rod. A device 4 preferably in the form of an animal is mounted at its front end on the crank 5 driven, or carried, by the traction wheel and at its rear end through a pivotal connection 6 with the slide 7, the slide 7 being slidingly mounted in a guide 8 carried by the push rod. The guide is formed ordinarily by two plates, one arranged above and one below the push rod, the edges of the plates being turned over at 8ª to retain the slide in place.

A crank 10 is mounted on the shaft 3 opposite the traction wheel 2 and a connecting rod 11 extends from the crank to the slide 12, the slide 12 being arranged in a guide 13 preferably formed with the same plates forming the guide 8.

In order to give the animal a running posture with the rod inclined as it ordinarily will be in the hands of an operator the connection between the animal and the crank at the front is at the bottom of the lower portion of the animal while the rear end is at the upper portion so that the animal will be approximately level or in natural posture with the rod inclined.

What I claim as new is:—

1. In a toy, the combination of a push rod; a traction wheel mounted on the rod; a crank driven by the wheel; a guide on the rod,-the guide being formed by plates secured to the top and bottom of the rod and extending therefrom; a slide in the guide; and devices extending from the crank to the slide.

2. In a toy, the combination of a push rod; a traction wheel mounted on the rod; a crank driven by the wheel at each side of the rod; a guide on the rod formed by plates arranged at the top and bottom of the rod, the edge of the plates extending beyond the face of the rod; slides in the guides; and a device extending from the cranks to the slides.

In testimony whereof I have hereunto set my hand.

WARD H. OGDEN.